US008851099B2

(12) United States Patent
DeGeorge et al.

(10) Patent No.: US 8,851,099 B2
(45) Date of Patent: Oct. 7, 2014

(54) PIPE MONITORING SYSTEM AND METHOD

(75) Inventors: Joseph P. DeGeorge, Beacon, NY (US); Joseph Casaregola, Hopewell Junction, NY (US); William Robert Copeland, Poughkeepsie, NY (US); Scott Matthew Hargash, Kingston, NY (US); Matthew F. Stanton, Salt Point, NY (US); Bryant L. Hancock, Poughkeepsie, NY (US); Kevin R. Geysen, Wappingers Falls, NY (US)

(73) Assignee: International Businss Machines Corporation, Armonk, NY (US)

( * ) Notice: Subject to any disclaimer, the term of this patent is extended or adjusted under 35 U.S.C. 154(b) by 233 days.

(21) Appl. No.: 13/489,508

(22) Filed: Jun. 6, 2012

(65) Prior Publication Data

US 2013/0327412 A1 Dec. 12, 2013

(51) Int. Cl.
*F17D 5/02* (2006.01)

(52) U.S. Cl.
USPC .............. 137/15.11; 137/87.01; 137/312; 137/557; 73/49.1

(58) Field of Classification Search
USPC ........... 137/15.11, 87.01, 312, 557, 594, 597; 73/49.1, 49.6; 285/55
See application file for complete search history.

(56) References Cited

U.S. PATENT DOCUMENTS

| 4,153,194 | A |   | 5/1979  | Leonard, Jr. |
|-----------|---|---|---------|--------------|
| 4,288,105 | A |   | 9/1981  | Press |
| 4,741,561 | A |   | 5/1988  | Morita et al. |
| 5,057,822 | A | * | 10/1991 | Hoffman ................... 340/611 |
| 5,769,108 | A | * | 6/1998  | Proudman ..................... 137/7 |
| 6,134,949 | A | * | 10/2000 | Leon et al. ................ 73/40.5 A |
| 6,230,735 | B1| * | 5/2001  | Bravo ......................... 137/312 |
| 6,367,843 | B1|   | 4/2002  | Fetzer |
| 6,820,465 | B2| * | 11/2004 | Summers et al. ................ 73/46 |
| 6,908,223 | B2|   | 6/2005  | Bibbo et al. |
| 7,500,489 | B2| * | 3/2009  | Folkers ....................... 137/312 |
| 7,894,297 | B2|   | 2/2011  | Nutt et al. |
| 2004/0134261 | A1 | * | 7/2004 | Pampinella .................. 73/49.1 |
| 2007/0193357 | A1 |   | 8/2007 | Daaland et al. |

FOREIGN PATENT DOCUMENTS

| CN | 201068796 Y | 6/2008 |
| CN | 201522353 U | 7/2010 |
| CN | 101831658 A | 9/2010 |

* cited by examiner

*Primary Examiner* — John K Fristoe, Jr.
*Assistant Examiner* — Reinaldo Sanchez-Medina
(74) *Attorney, Agent, or Firm* — Howard M. Cohn; William H. Steinberg

(57) ABSTRACT

A system and method for detecting leaks in pressurized or vacuum pipes is disclosed. A pipe clamp comprises a housing that surrounds a pipe fitting. A containment chamber within the pipe clamp prevents leaked gas from escaping into the environment. The pipe clamp is installed in series with an exhaust line to remove the leaked gas from the containment chamber. A sensor may be configured and disposed to detect a change in pressure in the containment chamber to indicate the occurrence of a leak.

19 Claims, 9 Drawing Sheets

US 8,851,099 B2

PIPE MONITORING SYSTEM AND METHOD

FIELD OF THE INVENTION

The present invention relates generally to manufacturing, and more particularly to a system and method for monitoring gas pipes in a manufacturing environment.

BACKGROUND

Semiconductor manufacturing requires a variety of process tools that utilize pressurized gas and/or vacuum to operate. Such tools include deposition tools and polishing tools, for example. In some cases, effluent adhering to pipe sidewalls gradually reduces the inside diameter of a pipe over time. This in turn makes the internal pressure higher, which can cause seal failures at pipe fittings. Often, an O-ring seal is employed in a pipe fitting which connects two pipe segments together. The increased pressure can cause O-rings to burst or leak. In a manufacturing environment with many process tools utilizing a variety of pressurized gas and vacuum sources, identifying the location of such a leak can be challenging. Furthermore, in some cases, the gases in use are highly toxic to people, warranting a need to quickly identify and locate such leaks for the safety of personnel on site. Ultrasonic leak detectors are not effective on active exhaust leaks as they can falsely identify flow in the pipe as a leak. Prior art exhaust gas detectors are large and bulky and provide only coarse information regarding the location of a leak. Therefore, it is desirable to have an improved pipe monitoring system and method for detecting and locating pipe leaks.

SUMMARY OF THE INVENTION

In one embodiment of the present invention, a pipe clamp is provided. The pipe clamp comprises, a housing, the housing configured and disposed to surround a pipe fitting, an input port disposed in the housing, an output port disposed in the housing, and a sensor port disposed in the housing, wherein the housing and the pipe fitting form a containment chamber.

In another embodiment of the present invention, a system for containing and monitoring gas pipe leakage is provided. The system comprises a first pipe clamp and a second pipe clamp. Each pipe clamp comprises a housing which is configured and disposed to surround a pipe fitting, an input port disposed in the housing, an output port disposed in the housing, and a sensor port disposed in the housing. The housing and the pipe fitting form a containment chamber. The first pipe clamp and second pipe clamp are connected in series with an exhaust line, such that the exhaust line is connected to the input port of the first pipe clamp, and the output port of the first pipe clamp is connected to the input port of the second pipe clamp. A second pipe clamp pressure sensor is configured and disposed to monitor pressure in the containment chamber of the second pipe clamp.

In another embodiment of the present invention, a method for containing and monitoring gas pipe leakage is provided. The method comprises covering a pipe fitting of a monitored pipe with a pipe clamp, connecting a pressure sensor to a sensor port on the pipe clamp, monitoring pressure inside the pipe clamp via the pressure sensor, and indicating a leak in the monitored pipe in response to detecting a pressure outside of a first predetermined pressure range.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

DETAILED DESCRIPTION

Figure 1:
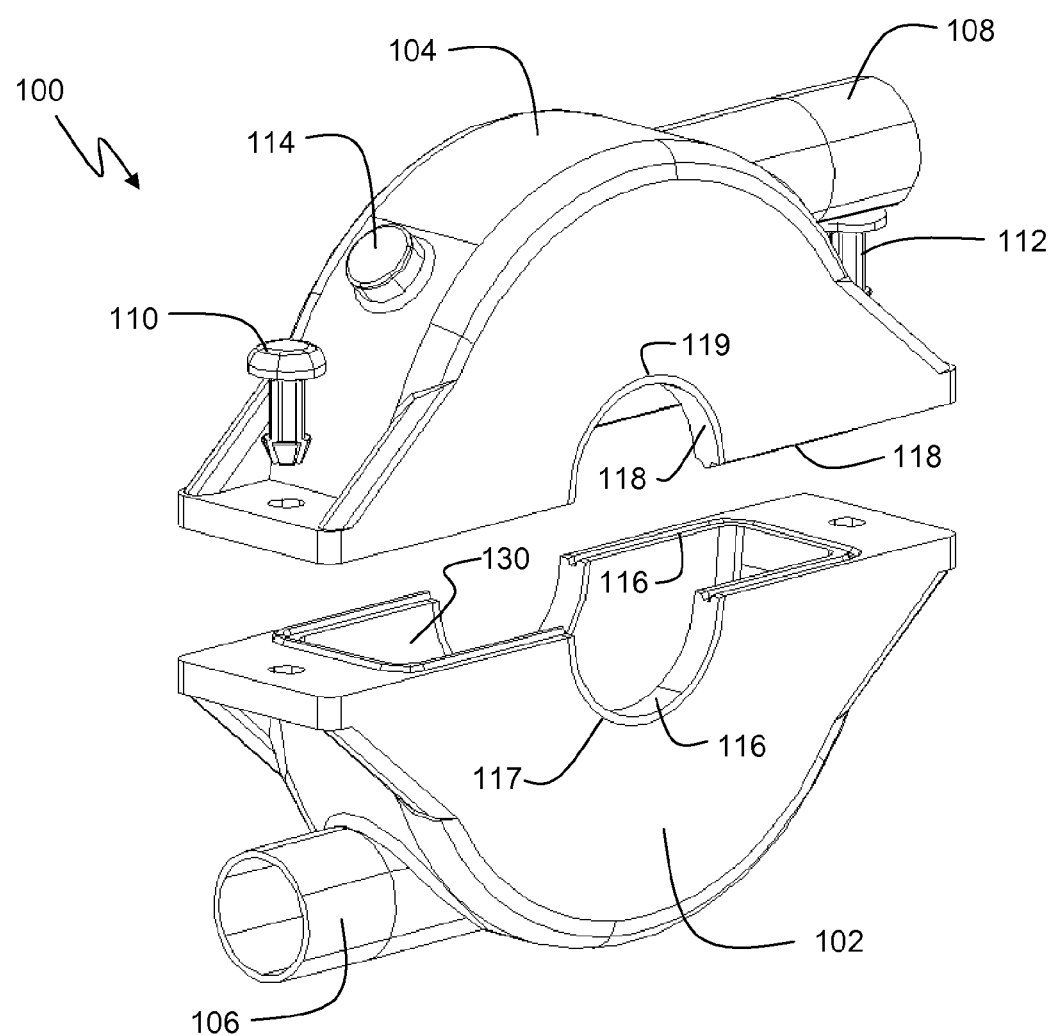
FIG. 1 is a perspective exploded view of a pipe clamp in accordance with an embodiment of the present invention.

FIG. 1 is a perspective exploded view of a pipe clamp 100 in accordance with an embodiment of the present invention. Pipe clamp 100 is comprised of a housing that is comprised of lower housing 102 and upper housing 104. Lower housing 102 comprises input port 106. Upper housing 104 comprises output port 108 and sensor port 114. Upper housing 104 has semicircle interior portion 119 and lower housing 102 has corresponding semicircle interior portion 117. Lower housing 102 has gasket 116 affixed to it along the mating edge where it meets upper housing 104. Similarly, upper housing 104 has gasket 118 affixed to it along the mating edge where it meets lower housing 102. In one embodiment, the gaskets 116 and 118 are comprised of rubber. The lower housing 102 and upper housing 104 may be comprised of polypropylene. In other embodiments, the lower housing 102 and upper housing 104 may be comprised of another type of plastic material. In other embodiments, the lower housing 102 and upper housing 104 may be comprised of a metal, such as stainless steal or aluminum. The upper housing 104 is fastened to lower housing 102 via fasteners 110 and 112. The lower housing 102 has a well 130 within it. A similar well is in the upper housing (not shown). When the lower housing 102 is fastened to upper housing 104, the wells unite to form a containment cavity and the semicircle interior portions 117 and 119 unite to surround, and fit around a pipe fitting. For simplicity in manufacturing the pipe clamp, lower housing 102 and upper housing 104 may be identical parts, although embodiments of the invention may utilize non-identical parts.

Figure 2:
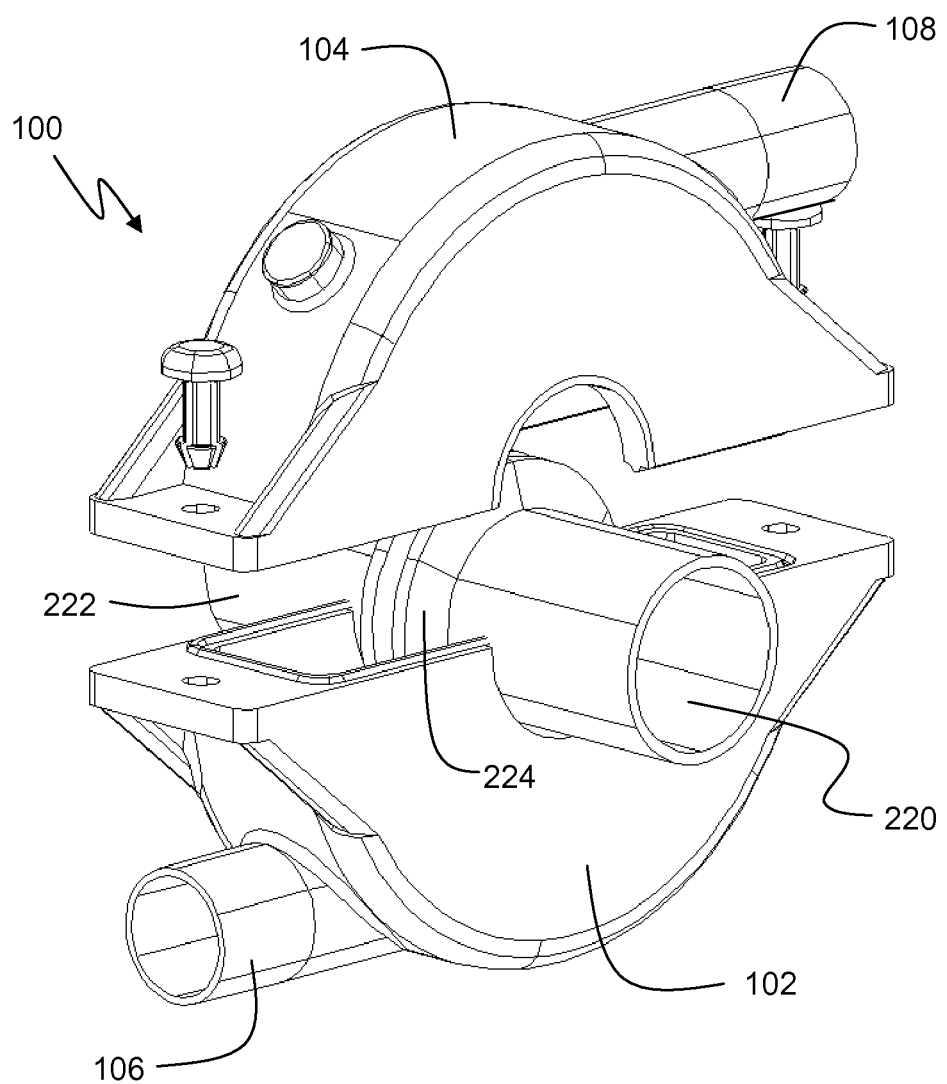
FIG. 2 is a perspective exploded view of a pipe clamp in accordance with an embodiment of the present invention illustrating a pipe fitting within the clamp.

FIG. 2 is a perspective exploded view of pipe clamp 100 illustrating a pipe fitting within the clamp. In this view, a first pipe segment 220 is affixed to a second pipe segment 222 via O-ring fitting 224. Upper housing 104 and lower housing 102 surround the O-ring fitting 224 to encapsulate it within the containment cavity.

Figure 3:
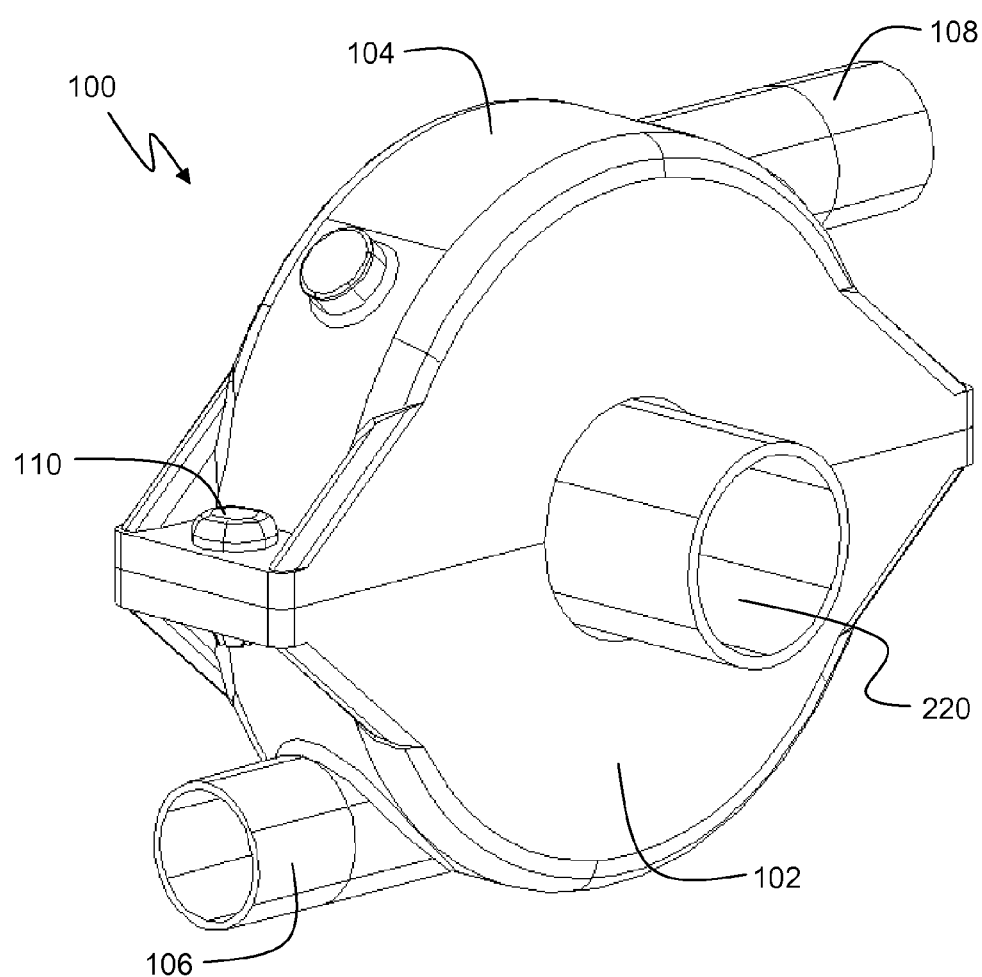
FIG. 3 is a perspective view of a pipe clamp in accordance with an embodiment of the present invention illustrating the clamp in a sealed position.

FIG. 3 is a perspective view of pipe clamp 100 illustrating the clamp in a sealed position. In this view, the upper housing 104 is fastened to lower housing 102 via fasteners 110 and 112 (see FIG. 2).

Figure 4:
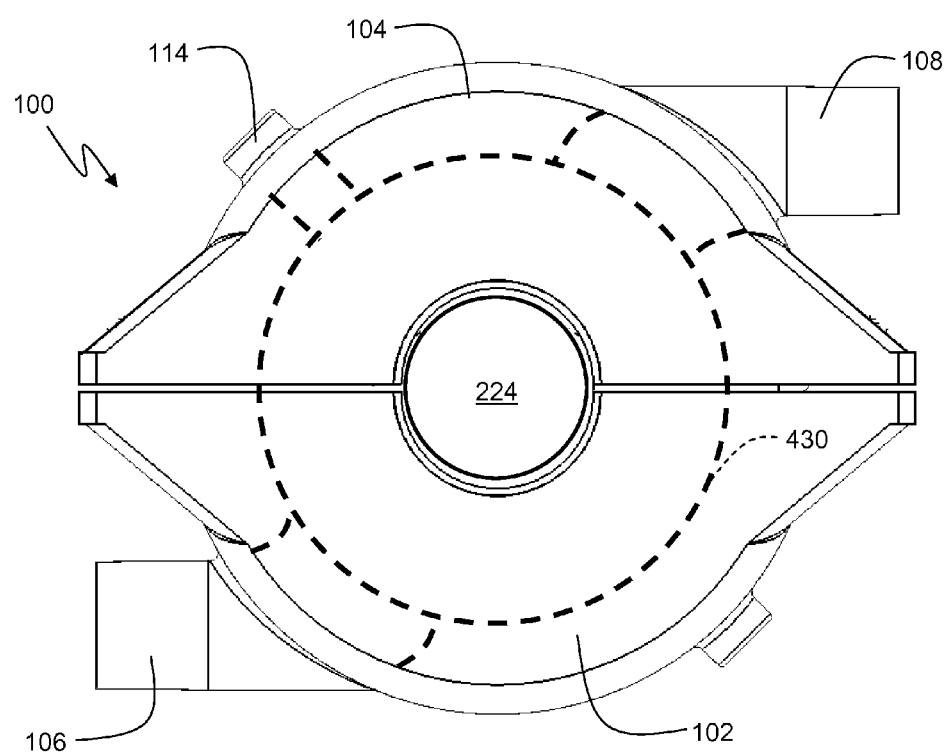
FIG. 4 is a side view of a pipe clamp in accordance with an embodiment of the present invention illustrating the containment chamber of the pipe clamp.

FIG. 4 is a side view of pipe clamp 100 illustrating the containment chamber 430 of the pipe clamp. The containment chamber 430 encapsulates O-ring fitting 224. Hence the housing (comprised of lower housing 102 and upper housing 104) and the fitting 224 form containment chamber 430. Input port 106 vents into the containment chamber 430, and the containment chamber 430 vents to output port 108 and sensor port 114. Sensor port 114 may be capped if a sensor is not in use.

Figure 5:
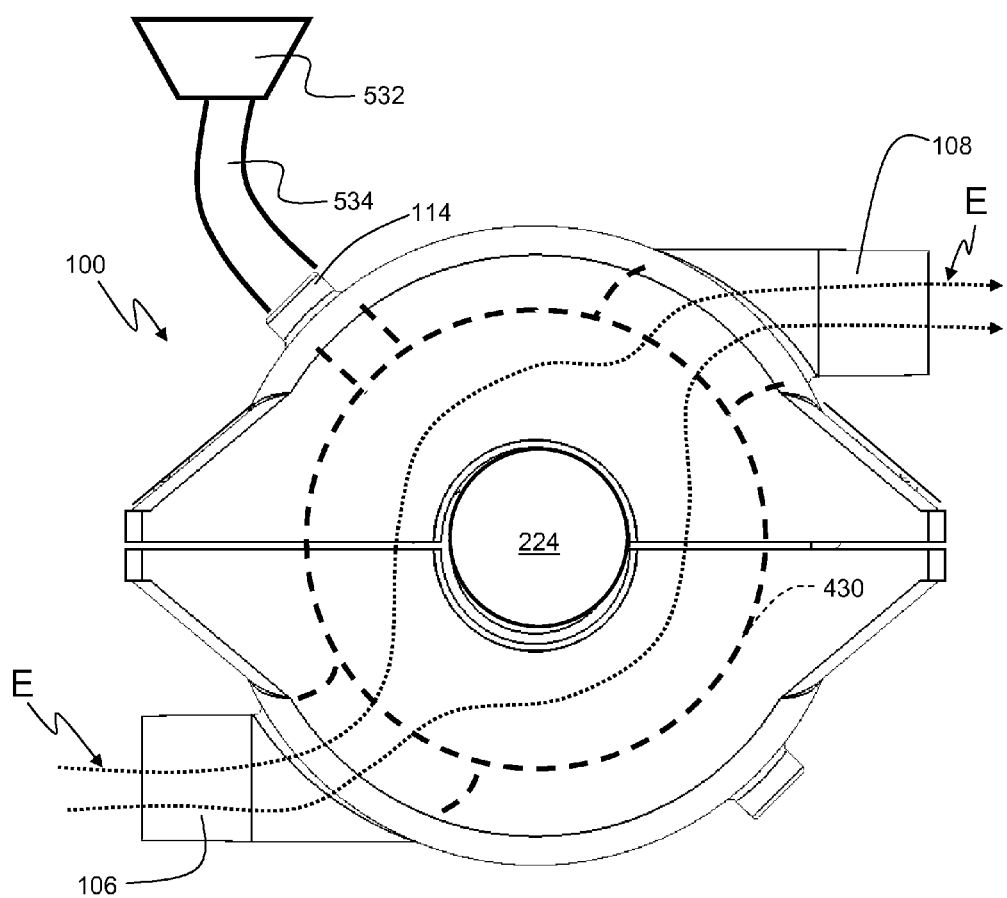
FIG. 5 is a side view of a pipe clamp in accordance with an embodiment of the present invention illustrating exhaust air flow through the pipe clamp.

FIG. 5 is a side view of pipe clamp 100 illustrating exhaust air flow through the pipe clamp. The exhaust airflow, indicated by the arrows with reference "E," enters pipe clamp 100 via input port 106 and exits via output port 108. A pressure sensor 532 is connected to a sensor conduit 534 which is connected to the sensor port 114. Under steady-state conditions, where the O-ring fitting 224 is intact, a relatively constant pressure level is detected by pressure sensor 532. In one embodiment, pressure sensor 532 is a differential pressure sensor. Pressure sensor 532 may also comprise an interface for determining the pressure, such as an analog signal, digital signal, and/or contact closure. The contact closure may be normally opened, and then close when the detected pressure is outside of a predetermined pressure range.

Figure 6:
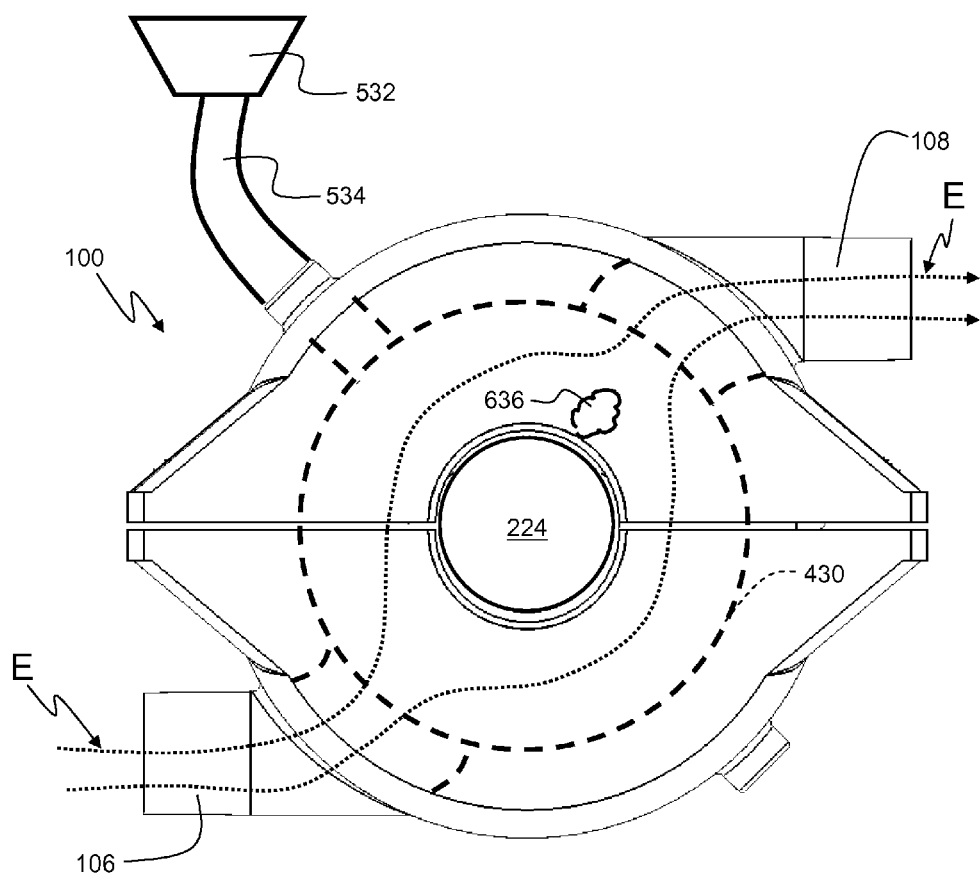
FIG. 6 is a side view of a pipe clamp in accordance with an embodiment of the present invention illustrating a leak in a monitored pipe.

FIG. 6 is a side view of a pipe clamp in accordance with an embodiment of the present invention illustrating a leak in a monitored pipe. In this case, the pressurized O-ring fitting 224 developed leak 636. This causes an increased pressure reading by sensor 532 which is then used to indicate a leak in fitting 224. The gas from leak 636 is vented out of the containment chamber 430 via output port 108, and can be vented to a safe location (e.g. into a scrubber or other environmentally safe location). Hence, the leak is both detected, and safely mitigated. While this example described a leak that causes an increase in the pressure detected by sensor 532, it is also possible to utilize embodiments of the present invention to detect vacuum leaks. In the case of a vacuum leak, the pressure detected by sensor 532 drops upon occurrence of a vacuum leak. The pressure drop can then be used to indicate a vacuum leak has occurred. Hence, embodiments of the present invention can identify a leak type as one of outward leak (pressure increase), and vacuum leak (pressure drop).

Figure 7:
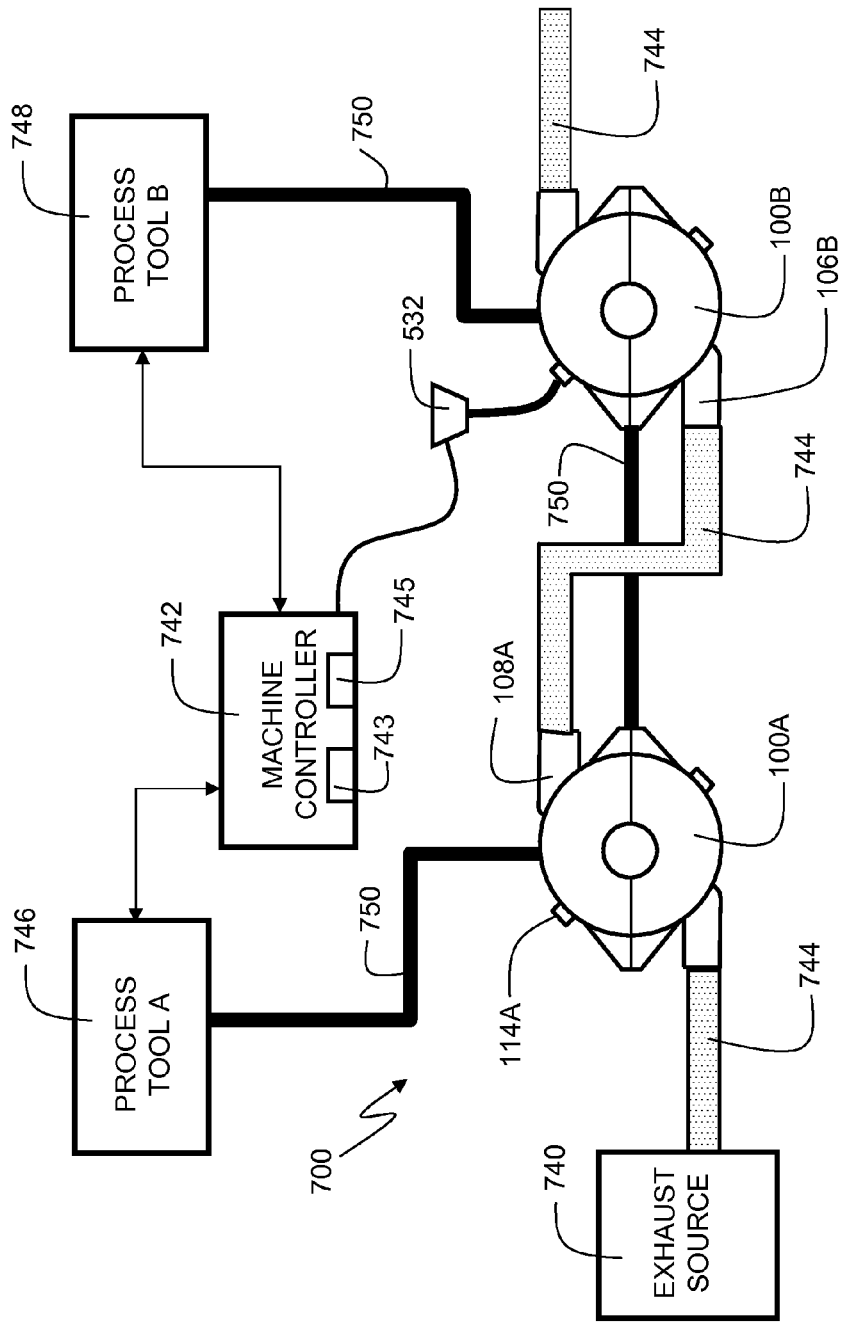
FIG. 7 is a block diagram of a system in accordance with an embodiment of the present invention.

FIG. 7 is a block diagram of a system 700 in accordance with an embodiment of the present invention. A first pipe clamp 100A is connected in series to a second pipe clamp 100B. The output 108A of pipe clamp 100A is connected to the input 106B of pipe clamp 100B. The pipe clamps 100A and 100B are in line with an exhaust line 744 that is connected to an exhaust source 740 (e.g. air pump). A sensor 532 is connected to second pipe clamp 100B, while no sensor is connected to pipe clamp 100A. The sensor port 114A for pipe clamp 100A is capped. The output of sensor 532 is connected to machine controller 742. Machine controller 742 may be a computer comprising a non-transitory computer memory 743 that contains instructions which, when executed by processor 745 onboard machine controller 742, activate a shutdown (or stop) sequence for process tools associated with the pipe clamp. Note, for the purposes of this disclosure, "shutdown" means putting the process tool in a stopped state, which may be a full shutdown, or other stopped, "offline" or "standby" state. The machine controller may send messages to each process tool to initiate its shutdown or stoppage. The machine controller may communicate to each process tool via a communications protocol, such as SECS/GEM, or other suitable protocol. The machine controller 742 may also indicate the leak to an operator. The indication (operator alert) may be in the form of an audible alert and/or visual alert in the production facility, such as a blinking light and buzzer. The machine controller may also send an e-mail and/or SMS (text) message to one or more addresses.

In this example, two process tools (746, 748) are controlled by machine controller 742.

Both process tools utilize a common compressed gas line 750 (for the sake of illustrative simplicity, not all parts of compressed gas line 750 are shown). Gas line 750 has seals that are covered by pipe clamp 100A and 100B. Gas line 750 is referred to as a "monitored pipe" because the integrity of its fittings is monitored by pipe clamps 100A and 100B. The pipe clamps cover the fittings of the monitored pipe. If the fitting (or seal) covered by pipe clamp 100A or 100B leaks, a pressure change is detected at sensor 532. It is then known the fitting at one or more of the pipe clamps has failed. Hence, the leak can be narrowed down to a subset of possible fittings within a production line. Note that while two pipe clamps are shown in this example, it is possible to use more than two pipe clamps. For example, eight pipe clamps may be used, where the sensor is connected to the last pipe clamp in the series, and the other seven pipe clamps have a capped sensor port. In this case, when the sensor registers a significant pressure change, it can be inferred that one of the eight fittings being monitored has failed.

Figure 8:
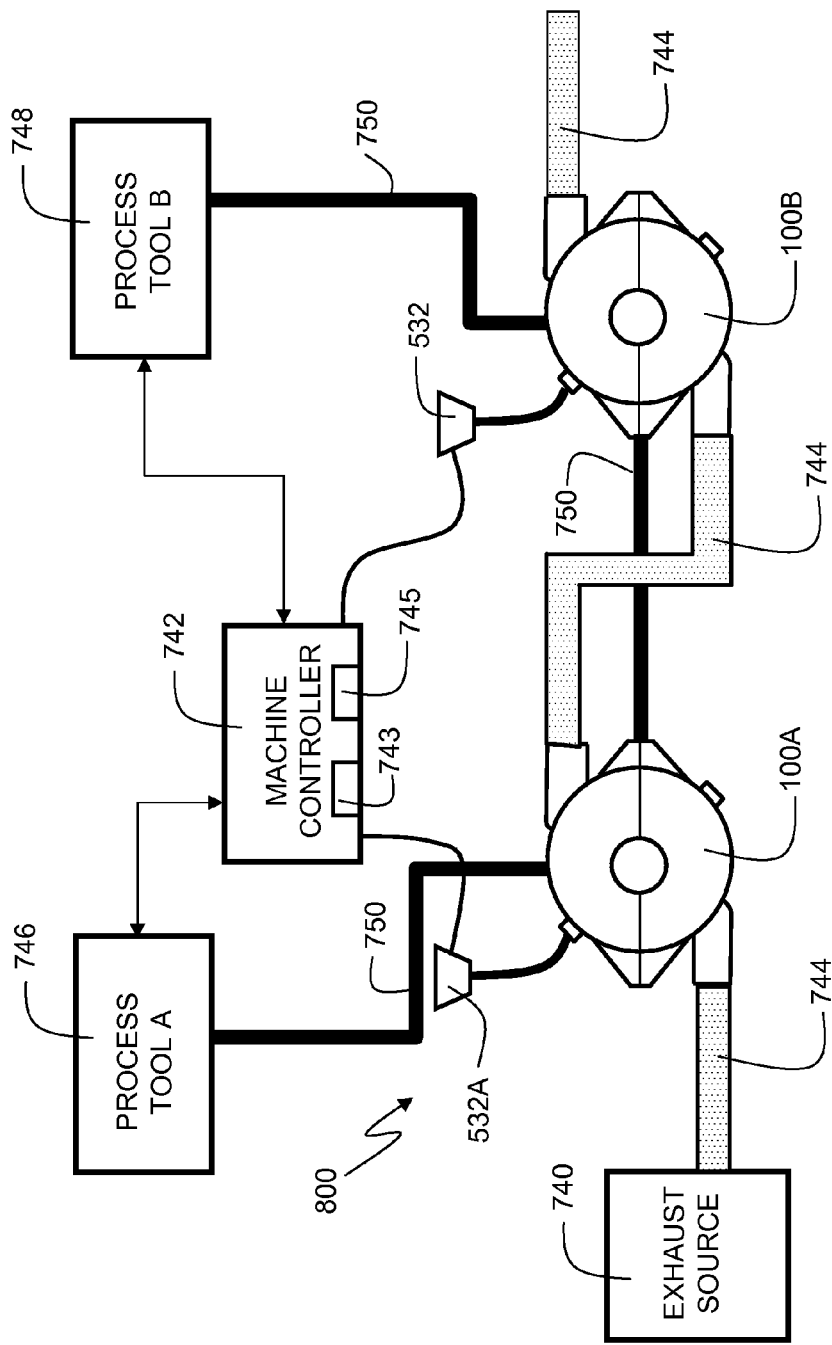
FIG. 8 is a block diagram of a system in accordance with an alternative embodiment of the present invention.

FIG. 8 is a block diagram of a system 800 in accordance with an alternative embodiment of the present invention. In this embodiment, each pipe clamp has a sensor. Hence, pipe clamp 100B has sensor 532 attached to it, and pipe clamp 100A has sensor 532A attached to it. In this case, it may be possible to determine which seal failed by detecting which sensor (532A or 532) measured a pressure difference first. For example, if the fitting monitored by pipe clamp 100A fails, then sensor 532A registers a pressure difference before pressure sensor 532. The time delta between when sensor 532A registers a pressure difference and when sensor 532 registers a pressure difference, depends in part, on the length of the gas line 750 between the two pipe clamps. In this way, by providing a sensor for each pipe clamp in the series, it provides for identifying which seal within the series has failed. It also provides a level of redundancy, such that if a particular sensor fails, functioning sensors on the other pipe clamps in series still register the pressure differential and can indicate a leak has occurred at a fitting along the monitored pipe. Note that while two pipe clamps are shown in this example, it is possible to use more than two pipe clamps. For example, eight pipe clamps may be used, where a sensor is connected to each of the eight pipe clamps in the series.

Figure 9:
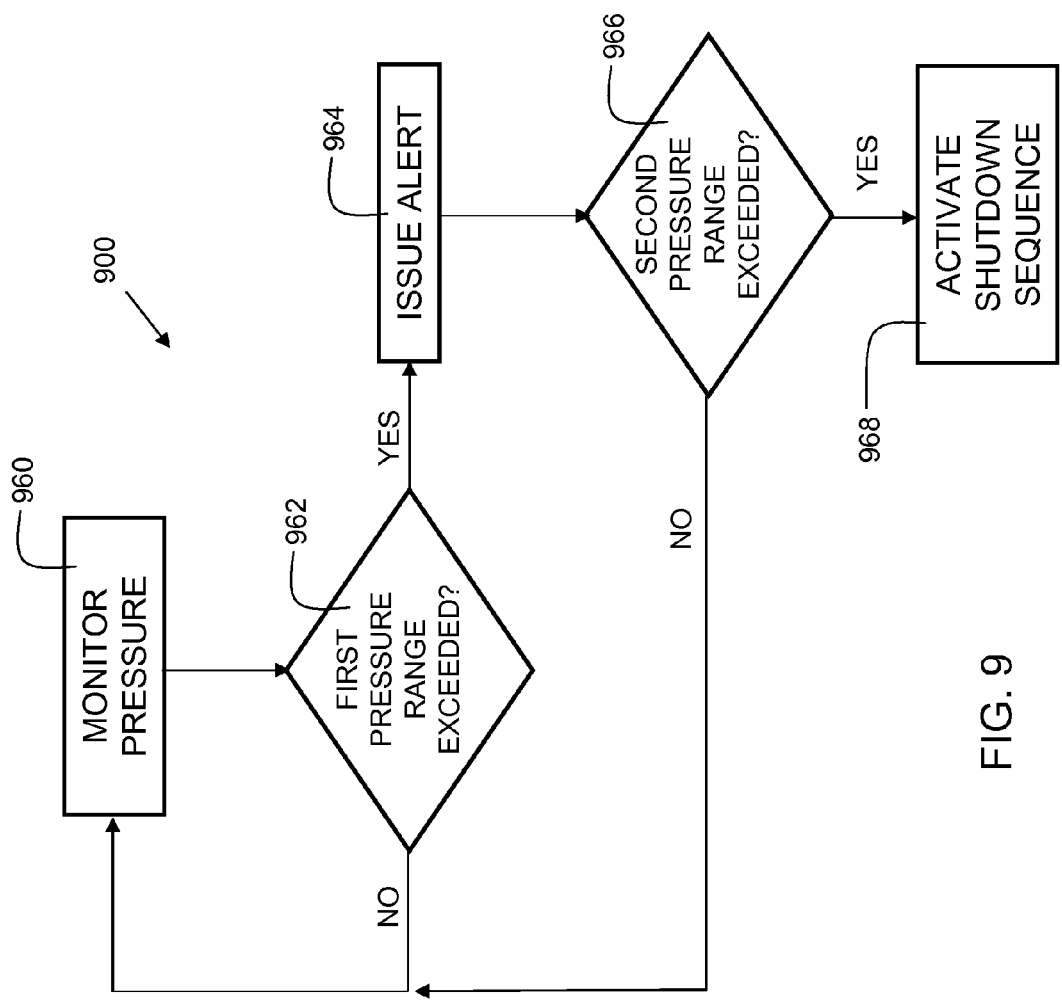
FIG. 9 is a flowchart indicating process steps for a method in accordance with an embodiment of the present invention.

FIG. 9 is a flowchart 900 indicating process steps for a method in accordance with an embodiment of the present invention. In this embodiment, a first pressure range and second pressure range may be established. The second pressure range is greater than, and encompasses the first pressure range. For example, the first pressure range may be −30 psi to 30 psi, and the second pressure range may be from −50 psi to 50 psi. Note that, depending on the application (e.g. pressurized gas, or vacuum) the monitored pressures may typically be either positive or negative. In process step 960, the pressure in a pipe clamp (such as shown in FIG. 5) that surrounds a monitored pipe fitting is continuously monitored. In process step 962, a check is made to determine if a first pressure range is exceeded. If not, then monitoring of pressure continues. If yes, then the leak is classified at a first severity level, and an alert is issued in process step 964. This may be performed by the machine controller (742 of FIG. 7). The alert may comprise an audio and/or visual alert near the location of the leak, or sending of e-mails, text messages, or automated phone calls to convey the alert. Alternatively, a combination of techniques may be used. In process step 966 a check is made to determine if a second pressure range is exceeded. If not, then monitoring of pressure continues. If yes, then the leak is classified at a second severity level, and the machine controller (742 of FIG. 7) activates a shutdown in process step 968 to shut down equipment that is associated with the leak. For example, if five process tools utilized a compressed nitrogen line, then all five tools may be shut down upon detection of a leak in the nitrogen line. The actions to take upon detection of a leak depend on the processes, and the type of gas. In some cases, the process tools can safely complete the current production cycle with the leak. In this case, the leak may be repaired during the next maintenance cycle. In cases where the safety of workers are at risk (e.g. the leaking gas is highly toxic), or where the product yield will significantly be impacted due to the leak (e.g. if a precursor gas is not flowing at the proper rate due to the leak), then the process tools may be shut down to address the leak immediately. Some embodiments may only issue alerts, or only activate a shutdown. Other embodiments may issue an alert, or both issue an alert and activate a shutdown.

As can now be appreciated, embodiments of the present invention provide an effective way to detect and contain gas leaks that can form in pipe fittings having seals such as O-rings. Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method for containing and monitoring gas pipe leakage comprising:
    surrounding a first pipe fitting of a first monitored pipe with a first pipe clamp to form a first containment chamber having an inlet port and an outlet port between the first pipe fitting and the first pipe clamp;
    surrounding a second pipe fitting of a second monitored pipe with a second pipe clamp to form a second containment chamber an inlet port and an outlet port between the second pipe fitting and the second pipe clamp;
    monitoring pressure inside the first containment chamber within the first pipe clamp via a first pressure sensor;
    monitoring pressure inside the second containment chamber within second pipe clamp via a second pressure sensor;
    connecting the first containment chamber with second containment chamber in series with an exhaust line connected to the input port of the first pipe clamp and between the output port of the first pipe clamp and the input port of the second pipe clamp and the outlet port of the second pipe clamp; and
    indicating a leak in one of the first and second monitored pipes in response to detecting a pressure in the exhaust line outside of a first predetermined pressure range.

2. The method of claim 1, further comprising:
    establishing a second predetermined pressure range, wherein the second predetermined pressure range encompasses the first predetermined pressure range;
    identifying a leak severity level, wherein the leak severity level is identified as a first severity level in response to detecting a pressure outside of the first predetermined pressure range and inside the second predetermined pressure range.

3. The method of claim 2, wherein the leak severity level is identified as a second severity level in response to detecting a pressure outside of the second predetermined pressure range.

4. The method of claim 3, further comprising:
    issuing an operator alert in response to a leak detected at a first severity level or second severity level; and
    activating an equipment shutdown for equipment associated with one of the first and second monitored pipes in response to a leak detected at a second severity level.

5. The method of claim 1, further comprising, identifying a leak type, wherein the leak type comprises one of outward leak, and vacuum leak.

6. The method of claim 1, further comprising activating a contact closure in response to indicating a leak.

7. The method of claim 1, further comprising issuing an operator alert in response to indicating a leak.

8. The method of claim 1, further comprising activating a shutdown for equipment associated with one of the first and second monitored pipes.

9. A system for containing and monitoring gas pipe leakage comprising:
    a first pipe clamp and a second pipe clamp, wherein each pipe clamp comprises:
        a housing, the housing configured and disposed to surround a pipe fitting;
        an input port disposed in the housing;
        an output port disposed in the housing; and
        a sensor port disposed in the housing,
        wherein the housing and the pipe fitting form a containment chamber;
    wherein the first pipe clamp and second pipe clamp are connected in series with an exhaust line, such that the exhaust line is connected to the input port of the first pipe clamp, and the output port of the first pipe clamp is connected to the input port of the second pipe clamp; and
    wherein a second pipe clamp pressure sensor is configured and disposed to monitor pressure in the containment chamber of the second pipe clamp.

10. The first and second pipe clamps of claim 9, wherein each housing comprises a first part and a second part, and wherein the first part and the second part are configured and disposed to fit around the pipe fitting of the first pipe clamp and the second pipe clamp.

11. The first and second pipe clamps of claim 10 wherein the first part and the second part each have a semicircle interior portion.

12. The first and second pipe clamps of claim 11, wherein the first part and the second part are comprised of polypropylene.

13. The first and second pipe clamps of claim 12, further comprising a gasket affixed to the first part and second part where the first part meets the second part and where the pipe fitting meets the first part and second part.

14. The first and second pipe clamps of claim 12, further comprising:
   first and second pressure sensors configured and disposed to monitor pressure in each of the containment chambers.

15. The first and second pipe clamps of claim 14, further comprising:
   first and second sensor conduits connected to the sensor port of the first pipe clamp and the second pipe clamp; and
   wherein the first and second pressure sensors are connected to the first and second sensor conduits.

16. The pipe clamp of claim 14, wherein the first and second pressure sensors each comprise a differential pressure sensor.

17. The system of claim 9, wherein the second pipe clamp pressure sensor is configured and disposed to activate a contact closure in response to a detected pressure outside of a predetermined range.

18. The system of claim 17, wherein the contact closure is configured and disposed to activate an equipment shutdown for equipment associated with the pipe fitting.

19. The system of claim 17, further comprising a first pipe clamp pressure sensor configured and disposed to monitor pressure in the containment chamber of the first pipe clamp.

* * * * *